UNITED STATES PATENT OFFICE.

JAMES E. ATWOOD, OF PITTSBURG, ASSIGNOR OF ONE-HALF HIS RIGHT TO HOWARD TILDEN, OF PHILADELPHIA, PENNSYLVANIA.

IMPROVEMENT IN THE MANUFACTURE OF STEEL FOR AGRICULTURAL IMPLEMENTS.

Specification forming part of Letters Patent No. 154,437, dated August 25, 1874; application filed June 25, 1874.

CASE A.

*To all whom it may concern:*

Be it known that I, JAMES E. ATWOOD, of Pittsburg, in the county of Allegheny and State of Pennsylvania, have invented certain new and useful Improvements in Compound or Mixture of Metals for Manufacturing Agricultural Implements, of which the following is a specification:

My invention relates to a new compound metal for the manufacture of agricultural implements, &c., which may be easily annealed, hammered, tempered, and fashioned into any desired shape without crumbling or breaking, as is the case in the ordinary malleable castings commonly made, and which can be tempered in water afterward, instead of being case-hardened, as is necessary in the ordinary castings for this purpose, and which will possess sufficient hardness, and be entirely free from porosity. My invention consists in a combination of ordinary cast or pig iron, wrought-iron, and scrap or waste iron, melted and united in the presence of a flux, which may consist of carbonate of lime, or marble-dust, or quartz-rock, or any of the silicic-acid compounds which contain no potash or other alkalies which will injure the iron.

The combination of the ingredients forming my compound metal may be effected in various ways, either in crucibles, cupolas, furnaces, or gas or air furnaces, as may be desired. In fact, any furnace in which the proper degree of heat can be produced may be employed, and will answer the purpose. The proportion of the ingredients to be employed will vary somewhat, however, according to the means or apparatus used for effecting the combination.

When melted and combined in a crucible, I employ cast and wrought iron in equal parts; when in a cupola-furnace, in the proportion of five-eighths of cast-iron and three-eighths of wrought-iron. The scrap may be added in any desired proportion to these ingredients, as the nature of the compound may require. When the ingredients are to be combined in a gas or air furnace, I employ three-eighths of cast-iron, four-eighths of wrought-iron, and one-eighth of scrap or old iron. These are all melted and combined in the presence of a flux consisting of carbonate of lime, or marble-dust, or silicon, or the silicic-acid compounds containing no potash or other active alkali which would injure the iron.

The scrap-iron, before being added to the mass, is melted and rendered homogeneous in any convenient manner—in a blast or cupola furnace, for instance.

Thus it will be seen that the prime object of my invention is to bring the metals into a perfect union in a molten state, and prepare them specially for casting in green-sand molds, since the metal is brought to such a high, pure, and hard state that it will lie in such molds, and all danger of explosions avoided.

I do not claim treating cast-iron, while in the boiling or puddling furnace, with copperas, salt, black oxide of manganese, litharge, yellow prussiate of potash, and such other chemicals, for the purpose of producing malleable iron, for such is not my invention.

What I claim is—

The improved compound metal for the manufacture of agricultural implements, &c., consisting of cast-iron, wrought-iron, and scrap-iron previously melted, the whole being united in the presence of a flux, such as marble-dust or its equivalents, as and for the purposes described.

In testimony that I claim the foregoing I have hereunto set my hand.

JAMES E. ATWOOD.

Witnesses:
JAMES L. NORRIS,
ALBERT H. NORRIS.